United States Patent [19]

Ozawa et al.

[11] Patent Number: 4,716,455
[45] Date of Patent: Dec. 29, 1987

[54] CHROMINANCE SIGNAL INTERPOLATION DEVICE FOR A COLOR CAMERA

[75] Inventors: Naoki Ozawa, Kokubunji; Toshiyuki Akiyama, Kodaira; Kazuhiro Satoh, Setagaya; Syusaku Nagahara, Hachioji; Itaru Mimura, Kokubunji, all of Japan

[73] Assignee: Hitachi, Ltd., Tokyo, Japan

[21] Appl. No.: 840,654

[22] Filed: Mar. 18, 1986

[30] Foreign Application Priority Data

Mar. 25, 1985 [JP] Japan .................. 60-58398

[51] Int. Cl.⁴ ...................... H04N 9/077; H04N 9/04
[52] U.S. Cl. .......................................... 358/44; 358/41
[58] Field of Search .................. 358/41, 43, 44, 48

[56] References Cited

U.S. PATENT DOCUMENTS

| 4,153,912 | 5/1979 | Gold | 358/44 |
| 4,467,347 | 8/1984 | Ozawa et al. | 358/44 |
| 4,605,956 | 8/1986 | Cok | 358/44 |
| 4,642,678 | 2/1987 | Cok | 358/44 |

FOREIGN PATENT DOCUMENTS

| 211377 | 11/1984 | Japan | 358/44 |
| 54586 | 3/1985 | Japan | 358/44 |

Primary Examiner—James J. Groody
Assistant Examiner—Randall S. Svihla
Attorney, Agent, or Firm—Antonelli, Terry & Wands

[57] ABSTRACT

In a solid-state imaging device, a chrominance signal different from a signal to be obtained at a specified time among a plurality of chrominance signals to be successively obtained from a solid-state image sensor is interpolated with the chrominance signal obtained directly before the time of interpolation, or with the chrominance signal of a picture element corresponding to the signal to be obtained at the time of interpolation based upon the subject being achromatic. The particular signal to be used for the interpolation is decided based upon the difference between the signal to be obtained at the time of interpolation and a signal of the same chrominance obtained one cycle before the time of interpolation, or the differences between signals obtained directly before the time of interpolation and to be obtained directly after the time of interpolation and the chrominance signals obtained one cycle before the times of these signals.

14 Claims, 17 Drawing Figures

| W | Cy | Ye | W | Cy |
|---|----|----|---|----|
| W | Cy | Ye | W | Cy |
| W | Cy | Ye | W | Cy |
| W | Cy | Ye | W | Cy |

(b)

| G | Cy | Ye | G | Cy |
|---|----|----|---|----|
| G | Cy | Ye | G | Cy |
| G | Cy | Ye | G | Cy |
| G | Cy | Ye | G | Cy |

(c)

| G | R | G | B | G | R |
|---|---|---|---|---|---|
| G | R | G | B | G | R |
| G | R | G | B | G | R |
| G | R | G | B | G | R |

(d)

| W | Cy | Ye | G | W | Cy |
|---|----|----|---|---|----|
| W | Cy | Ye | G | W | Cy |
| W | Cy | Ye | G | W | Cy |
| W | Cy | Ye | G | W | Cy |

(e)

| G | R | G | R | G |
|---|---|---|---|---|
| B | G | B | G | B |
| G | R | G | R | G |
| B | G | B | G | B |

(f)

| R | G | B | R | G | B |
|---|---|---|---|---|---|
|   | B | R | G | B | R |
| R | G | B | R | G | B |
|   | B | R | G | B | R |

CHROMINANCE SIGNAL INTERPOLATION DEVICE FOR A COLOR CAMERA

BACKGROUND OF THE INVENTION

The present invention relates to an imaging device, and more particularly to a single-chip color video camera which employs one solid-state image sensor.

At present, a single-chip color video camera which produces color video signals with one solidstate image sensor has been put into practical use. In such a camera, several kinds of color filters having different transmission light characteristics are disposed in cyclic correspondence with the respective picture elements (photoelectric conversion elements) of the solid state image sensor, to obtain a plurality of chrominance signals. Accordingly, the spatial sampling frequency of each chrominance signal is lowered to several tenths of the sampling frequency of the picture elements, and a colored moire pattern is prone to appear.

A method of lessening color moire patterns from a single-chip color video camera is described in Japanese Patent Application Laid-open No. 54-131819 and U.S. Pat. No. 4,153,912 corresponding thereto.

With this method, operations to be stated below are performed. By way of example, when color filters shown in FIG. 1 (in which letters R, G and B denote color filters transmitting red, green and blue, respectively) are combined so that the individual filter elements are held in one-to-one correspondence with the picture elements of the solid-state image sensor, signals illustrated in FIG. 2(a) are obtained. The signals are separated to obtain a red signal, a green signal and a blue signal (hereinbelow, abbreviated to "R, G and B signals" respectively) shown in FIGS. 2(b)-2(d), in which by way of example, at a time $t_1$, the R signal is obtained but the G and B signals are not obtained, and at a time $t_2$, the G signal is obtained but the R and B signals are not obtained. Therefore, at the time $t_1$ by way of example, the magnitudes of $R_0$ and $R_2$ are compared with the magnitude of $R_1$ to determine which of the magnitudes is closer to the magnitude of $R_1$, and the G signal and the B signal are interpolated with $G_0$ and $B_0$ respectively when $R_1$ is closer in magnitude to $R_0$ or when $R_1$ is close both to $R_0$ and $R_2$, and are interpolated with $G_1$ and $B_1$ respectively when $R_1$ is closer in magnitude to $R_2$ or when $R_1$ is close neither to $R_0$ nor to $R_2$. When the R, G and B signals are interpolated by such operations, three signals of high sampling frequency and uniform phase as shown in FIGS. 2(e)-2(g) are obtained. As a result, signals to be originally derived are interpolated substantially correctly at the boundary parts of a subject (object) having a sufficient size as compared with the interval of the picture elements, and the colored moire pattern to appear at the boundary parts are relieved.

However, regarding a subject having a moire pattern which varies in a range several times larger than the interval of the picture elements, the original signals cannot be correctly interpolated, and there is the problem that the colored moire pattern increase conversely.

By way of example, when bright and dark subjects are focused on the color filters shown in FIG. 1 in correlations shown in FIG. 3, signals shown in FIG. 4(a) are obtained. When they are separated into R, G and B signals which are then subjected to the processing of the prior art stated above, signals in FIGS. 4(b)-4(d) are obtained. When these signals are compared with the circumstances of the subjects in FIG. 3, the B signal at a time $t_4$, the G signals at times $t_6$ and $t_7$, and so on are obviously different from signals to be originally derived. As a result, signals produced as if a blue subject were imaged are obtained at the time $t_4$ by way of example, and there is the problem that the false color appears on a reproduced picture.

SUMMARY OF THE INVENTION

An object of the present invention is to provide a solid-state imaging device which is less prone to develop false colors even in a subject image that varies in a range several times larger than the picture element interval of a solid-state image sensor.

In order to accomplish the object, according to the present invention, in a solid-state imaging device, a chrominance signal different from a signal to be obtained at a specified time among a plurality of chrominance signals to be successively obtained from a solid-state image sensor is interpolated with the necessary chrominance signal obtained directly before the time of interpolation, or with the necessary chrominance signal of a picture element corresponding to the signal to be obtained at the time of interpolation, as found assuming that a subject is achromatic. Which of the signals is to be used for the interpolation is decided according to the difference between the signal to be obtained at the time of interpolation and a signal of the same chrominance obtained one cycle before the time of interpolation, or the differences between signals obtained directly before the time of interpolation and to be obtained directly after the time of interpolation and the pertinent chrominance signals obtained one cycle before the times of these signals.

According to the present invention, a subject image which varies in a range several times larger than the picture element interval of the solid-state image sensor is subjected to signal interpolations for which it is difficult to develop false colors, and colored moire patterns are sharply reduced.

BRIEF DESCRIPTION OF THE DRAWINGS

FIG. 17 shows diagrams (a)-(f) (hereinafter referred to as FIGS. 17(a)-17(f)) showing other examples of a filter for a single-chip color video camera to which the present invention is applicable.

DETAILED DESCRIPTION OF PREFERRED EMBODIMENTS

An embodiment of the present invention will be described with reference to FIG. 5 and FIGS. 6(a)-6(g).

Figures 1, 2:
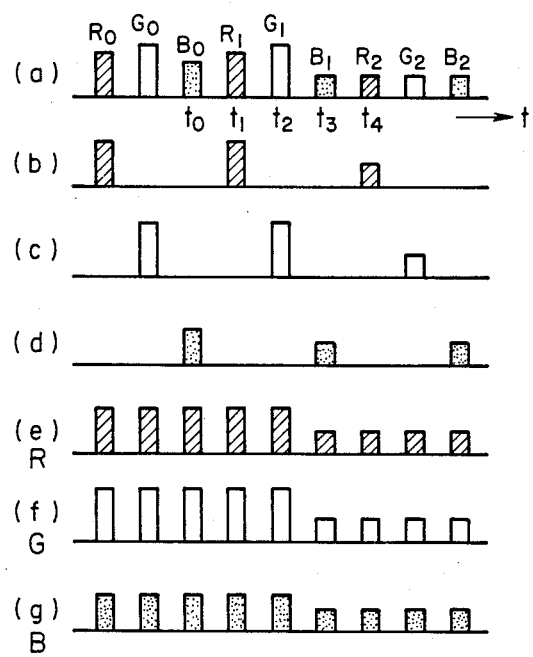
FIG. 1 is a diagram showing an example of a filter for a single-chip color video camera.
FIG. 2 shows diagrams (a)-2(g) (hereinafter referred to as FIGS. 2(a)-2(g)) showing signals for explaining the operation of the prior-art example.
Figure 3:
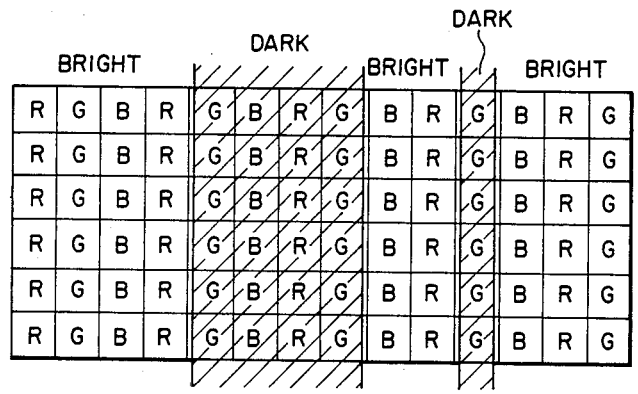
FIG. 3 a diagram showing an example of a subject for pointing out a problem involved in the prior-art example.
Figure 5:
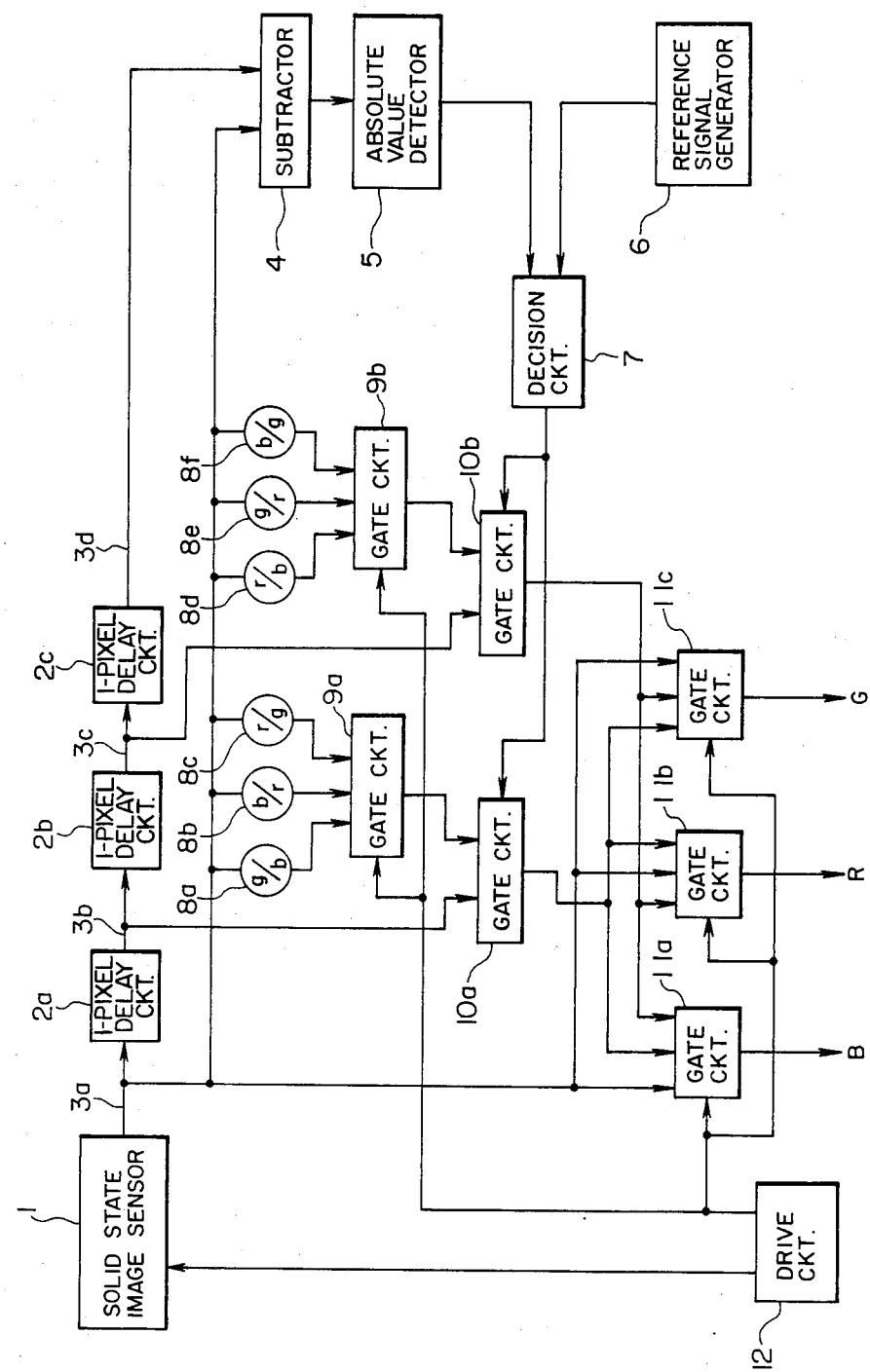
FIG. 5 a diagram showing an embodiment of the present invention.
Figure 6:
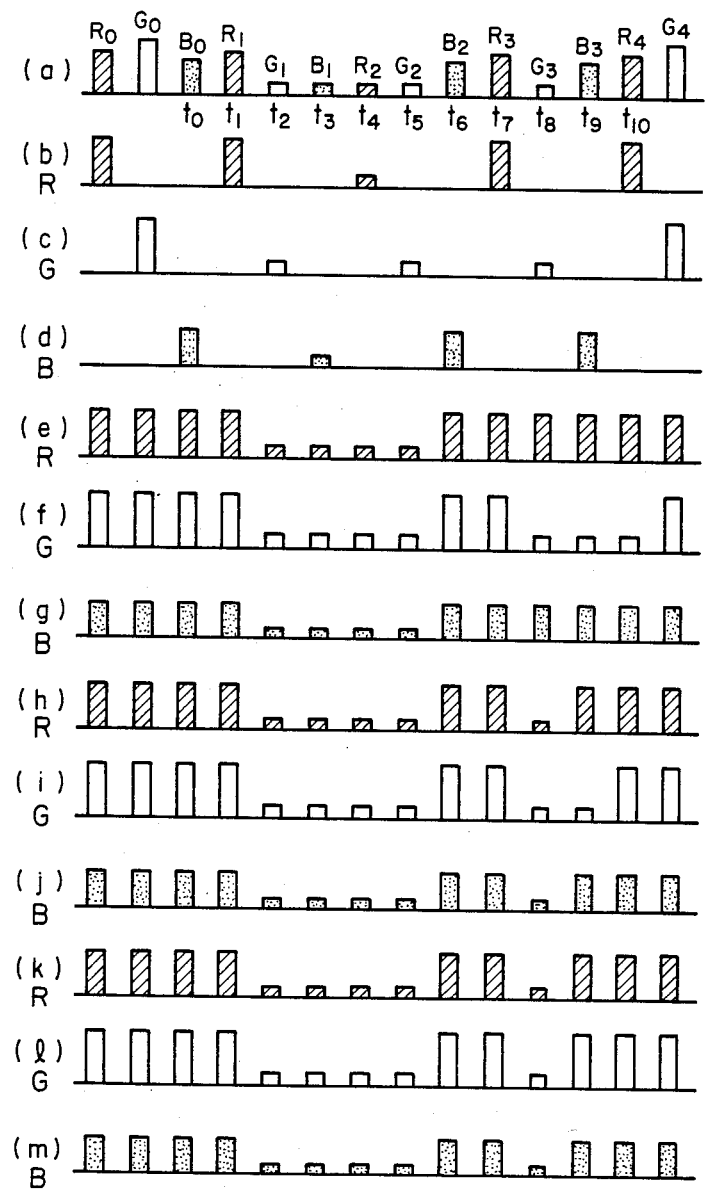
FIG. 6 shows diagrams (a)-(m) (hereinafter referred to as FIGS. 6(a)-6(m)) showing signals obtained in the embodiments of the present invention.

In the device of FIG. 5, it is assumed by way of example that the color filters shown in FIG. 1 are combined with a solid-state image sensor 1. At this time, when bright and dark subjects are focused in the positions shown in FIG. 3, signals shown in FIG. 6(a) are output from the image sensor 1. They are successively applied to delay circuits 2a, 2b and 2c which are connected in series. The delay magnitude of each of the delay circuits 2a, 2b and 2c is set equal to the sampling period of picture element signals. As a result, at a time $t_3$ by way of example, picture element signals $B_1$, $G_1$, $R_1$ and $B_0$ provided from the solid-state image sensor 1 at times $t_3$, $t_2$, $t_1$ and $t_0$ respectively are simultaneously obtained on output lines $3_a$, $3_b$, $3_c$ and $3_d$.

Meanwhile, R, G and B signals into which the signals in FIG. 6(a) have been separated by sampling are as shown in FIGS. 6(b)-6(d) respectively. When the time $t_3$ is taken as an example, the picture element signal $B_1$ is obtained as the B signal, but the R signal and the G signal do not exist. When a subject image does not abruptly change between a picture element corresponding to $B_0$ and a picture element corresponding to $B_1$, it can be expected that the difference between the values of $B_0$ and $B_1$ will be small and that the differences between $R_1$ and $G_1$ obtained meantime and the R and G signals to be obtained at the time $t_3$ will also be small. In contrast, in a case where a subject image changes abruptly between the picture element corresponding to $B_0$ and the picture element corresponding to $B_1$, there is a high possibility that the difference between the values of $B_0$ and $B_1$ will be great and that the differences between $R_1$ and $G_1$ and the R and G signals to be obtained at the time $t_3$ will also be great.

Therefore, the difference signal between $B_0$ and $B_1$ is produced, whereupon when it does not exceed a reference value selected at will, it is deemed that the abrupt change of the subject does not exist, and the R and G signals corresponding to the time $t_3$ are respectively interpolated with $R_1$ and $G_1$ which have been obtained. In addition, when the difference signal between $B_0$ and $B_1$ is greater than the reference value, it is deemed that the abrupt change of the subject exists, and $R_1$ and $G_1$ are not used for the interpolations of the R and G signals corresponding to the time $t_3$. At this time, the subject imaged by the picture element corresponding to $B_1$ is assumed to be achromatic, and R and G signals to be obtained in the achromatic subject in which $B_1$ is obtained are used for the interpolations.

Although, in the above description, the method of obtaining the R and G signals corresponding to the time $t_3$ has been taken as the example, the same can be applied to respective signals corresponding to the other times, by replacing the relations of R, G and B in succession.

In general, in the video signals of the NTSC format, the PAL format, etc., the frequency band of chrominance signals is narrower than that of luminance signals. Accordingly, the chrominance signals need not follow abrupt changes corresponding to high frequency responses, and the quality of a reproduced picture is not heavily deteriorated even when the chrominance signals are not obtained at the boundary parts etc. of a subject image. Besides, considering the fact that an ordinary subject includes a small number of subjects of high saturation, it can be expected that no great error will arise even when interpolations are performed with achromatic signals.

To the end of realizing the above signal processing, in the embodiment shown in FIG. 5, a signal (for example, $B_1$ at the time $t_3$) obtained from the output line 3a and a signal (for example, $B_0$ at the time $t_0$) obtained from the output line 3d are applied to a subtractor 4. Further, the output signal of the subtractor 4 is applied to an absolute value detector 5 so as to obtain a unipolar difference signal. The difference signal thus obtained is applied to a decision circuit 7 together with a reference signal which is provided from a reference signal generator 6. The decision circuit 7 produces a control signal of "1" in a case where the difference signal is greater than the reference signal, and it produces a control signal of "0" in a case where the difference signal is smaller than the reference signal.

Meanwhile, the signal obtained from the output line 3a is applied to a gate circuit 9a via gain controllers 8a, 8b and 8c and is similarly applied to a gate circuit 9b via gain controllers 8d, 8e and 8f.

Here, symbols Rm, Gm and Bm denote the magnitudes of signals which are derived from picture elements corresponding to the respective color filters R, G and B when an achromatic subject having an arbitrary luminance has been imaged by way of example. At this time, the output signal ratios of the picture elements of R, G and B for the achromatic subject are obtained by selecting r, g and b which meet the following expression:

$$Rm/r = Gm/g = Bm/b \tag{1}$$

Using r, g and b thus found, the gains of the gain controllers 8a, 8b and 8c are respectively set at g/b, b/r and r/g, and the gains of the gain controllers 8d, 8e and 8f are respectively set at r/b, g/r and b/g.

As a result, when the signal derived from the output line 3a is the B signal by way of example, the corresponding G signal to be obtained in the achromatic subject is provided from the gain controller 8a, and the corresponding R signal is provided from the gain controller 8d.

Meanwhile, the $G_1$ signal is obtained from the output line 3b and the $R_1$ signal from the output line 3c at this time as understood from FIG. 6(a). Therefore, when the device is so controlled that the outputs of the gain controllers 8a and 8d are respectively caused to appear at the outputs of the gate circuits 9a and 9b by a signal from a drive circuit 12 as synchronized with the drive pulse of the solidstate image sensor 1, a gate circuit 10a is supplied with the G signal found from the $B_1$ signal obtained at that time and the $G_1$ signal obtained immediately before the $B_1$ signal, and a gate circuit 10b is similarly supplied with the R signal found from the $B_1$ signal obtained at that time and the $R_1$ signal obtained immediately before the $B_1$ signal.

Likewise, when the signal derived from the output line 3a is the R signal, the B signal and G signal corresponding to the achromatic subject are respectively provided from the gain controllers 8b and 8e, and when the signal derived from the output line 3a is the G signal, the R signal and B signal corresponding to the achromatic subject are respectively provided from the gain controllers 8c and 8f. The gate circuits 9a and 9b have their operations controlled so that the outputs of the gain controllers 8b and 8e may appear at the outputs of the respective gate circuits when the signal of the output line 3a is the R signal, and that the outputs of the gain controllers 8c and 8f may appear when the signal of the output line 3a is the G signal. Then, the gate circuits 10a and 10b are simultaneously supplied with the chrominance signal of the achromatic subject found from the chrominance signal obtained at that time and the chrominance signal obtained immediately before the former signal.

Here, the control signal provided from the decision circuit 7 is applied to the gate circuits 10a and 10b. When the control signal for the gate circuits is "1", that is, when the difference between the signal obtained at that time and the signal of the same chrominance obtained one cycle before is great, the chrominance signals corresponding to the achromatic subject as provided from the gate circuits 9a and 9b appear at the outputs of the respective gate circuits 10a and 10b. When the control signal is "0" from the decision circuit, that is, when the difference between the signal obtained at that time and the signal of the same chrominance obtained one cycle before is small, the chrominance signals directly before them as derived from the output lines 3b and 3c appear.

Further, the signals provided from the gate circuits 10a and 10b are applied to gate circuits 11a, 11b and 11c together with the signal derived from the output line 3a. The signal provided from the drive circuit 12 and synchronized with the drive pulse of the solid-state image sensor 1 is applied to the gate circuits 11a, 11b and 11c, to control them so that the B signal, R signal and G signal may be separately provided from the outputs of the respective gate circuits.

Figure 4:
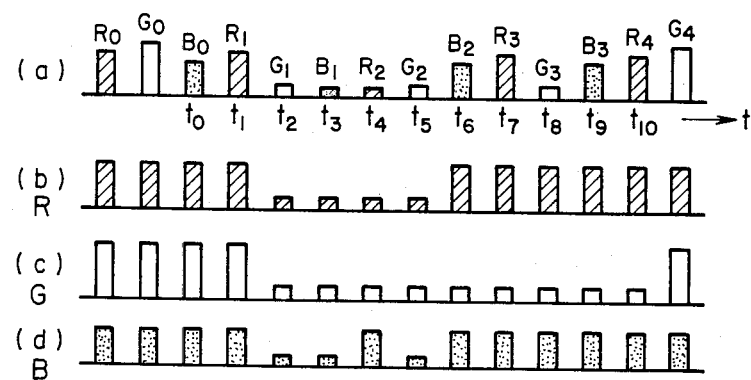
FIG. 4 shows diagrams (a)-(d) (hereinafter referred to as FIGS. 4(a)-4(d)) showing signals obtained for subject shown in FIG. 3.

As the result of the above, the R, G and B signals whose sampling frequencies are equal to the sampling frequency of the picture elements and whose phases are uniform, as illustrated in FIGS. 6(e)–6(g), can be obtained from the signals in FIG. 6(a). The obtained signals are somewhat different from the signals originally obtained, but when they are compared with the signals obtained by the prior-art example as shown in FIGS. 4(b)–4(d), the B signal corresponding to a time $t_4$ and the G signals corresponding to times $t_6$ and $t_7$ are improved, and false colors appearing on the reproduced picture are lessened.

Figure 7:
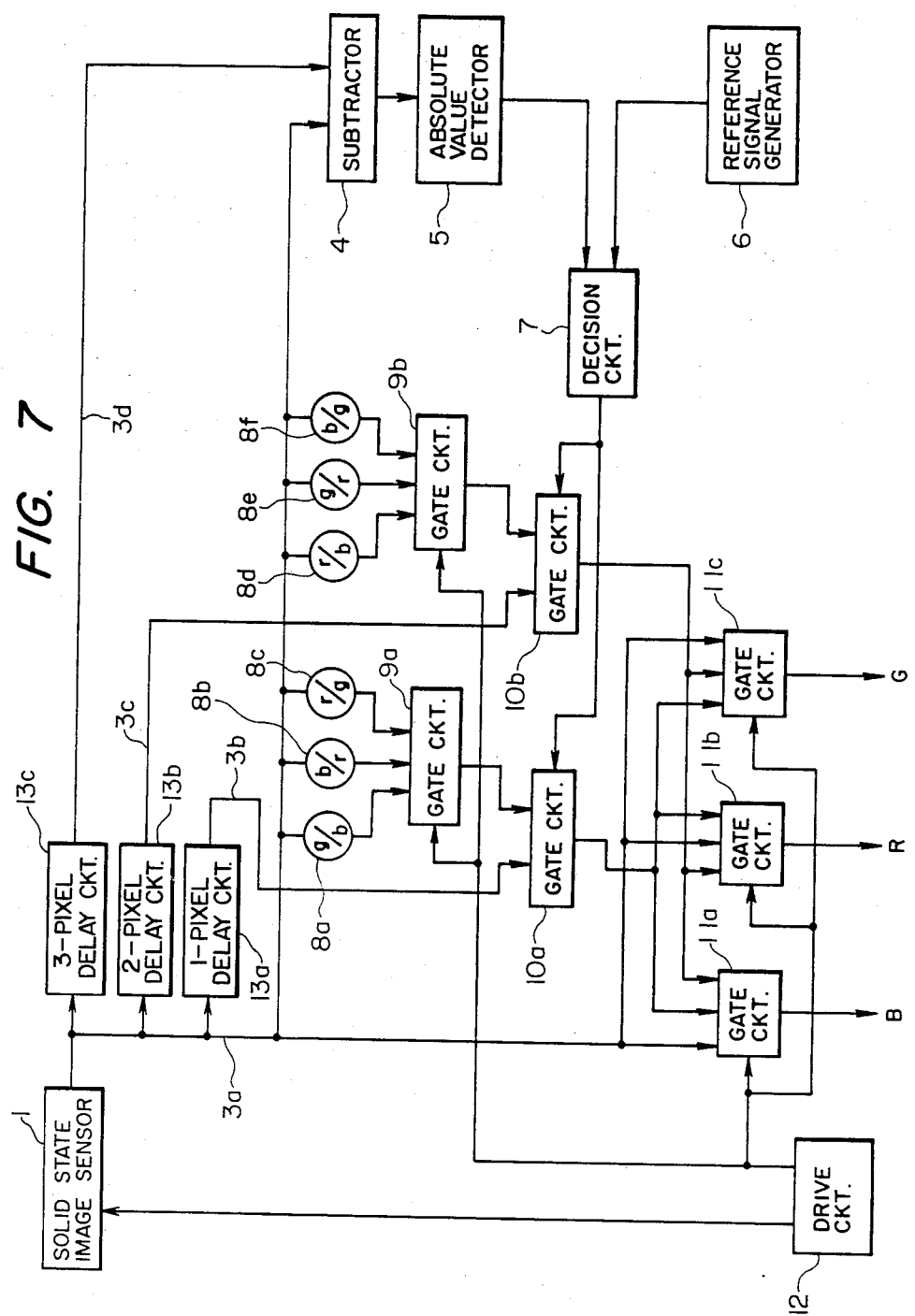
FIGS. 7, 8, 9, 11, 13, 14,15 and 16 are diagrams each showing another embodiment of the present invention.

In the embodiment shown in FIG. 5, the picture element signals provided from the solid-state image sensor 1 are delayed by the delay circuits 2a, 2b and 2c which are connected in series. As in another embodiment shown in FIG. 7, however, delay circuits 13a, 13b and 13c whose delay times are one, two and three times as long as the sampling period of the picture elements respectively can also be employed in parallel connection. Otherwise, like reference numerals in FIG. 7 identify the same parts as in FIG. 5.

In the embodiment shown in FIG. 5, the constant reference signal generated from the reference signal generator 6 is applied to the decision circuit 7. In such a case, since the output of the B signal for the achromatic subject is usually smaller than those of the other signals, an inconvenience might occur that, as to the same change of the achromatic subject, the control signal becomes "1" for the G signal, whereas it becomes "0" for the B signal. As shown in an embodiment of FIG. 8, therefore, the constant reference signal generated from the reference signal generator 6 is converted into reference signals of magnitudes respectively proportional to b, r and g by potentiometers 14a, 14b and 14c, whereupon the converted signals are applied to a gate circuit 15. The gate circuit 15 is supplied with the same control signal from the drive circuit 12 as that to be applied to the gate circuits 9a and 9b, to control it so that the reference signal to be provided from the output of the gate circuit 15 may correspond to the kind of the color of the signal provided from the absolute value detector 5. As a result, the decision circuit 7 produces stable control signals the decisions of which do not change even when the kinds of the input chrominance signals differ.

Figure 9:
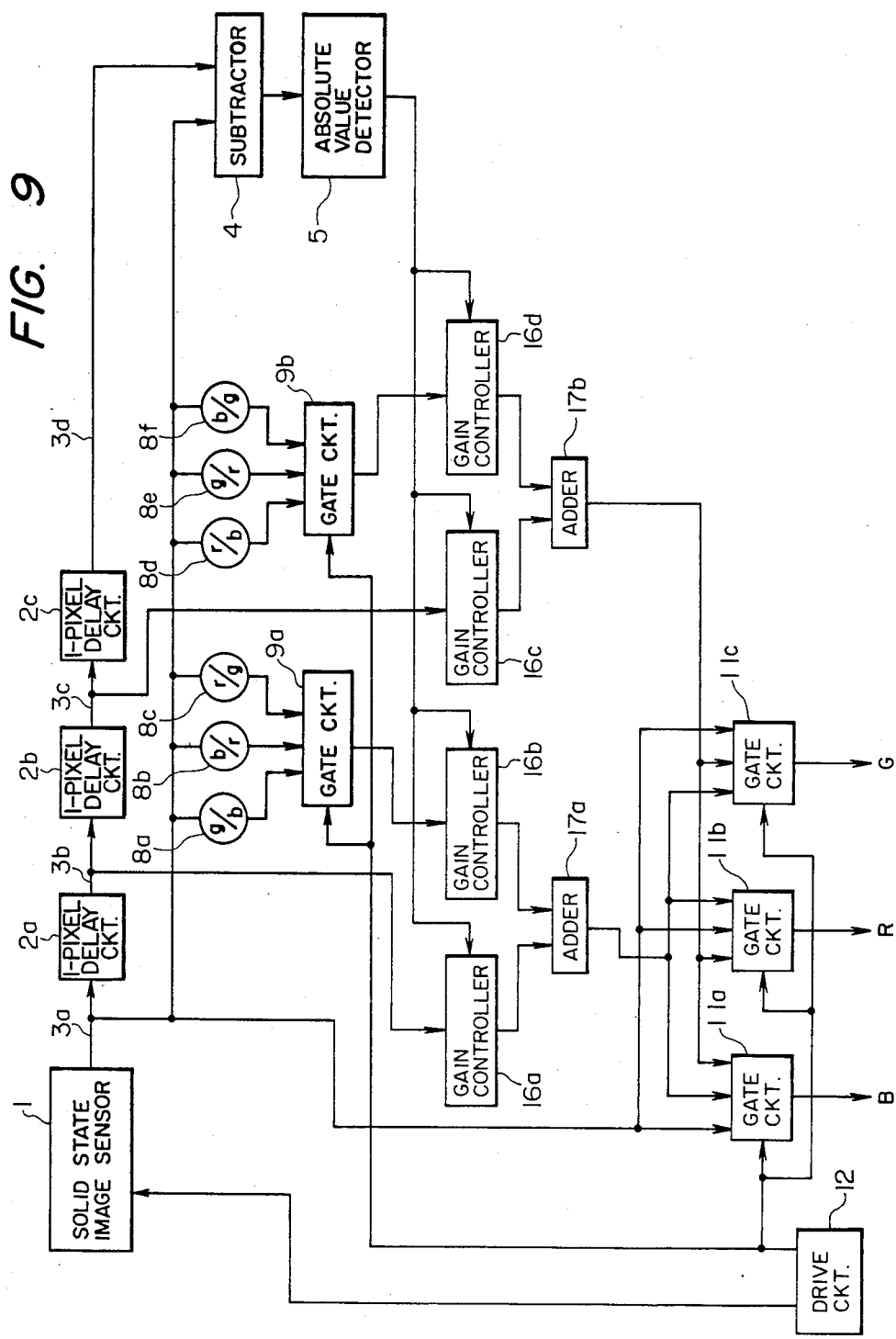
Figure 10:
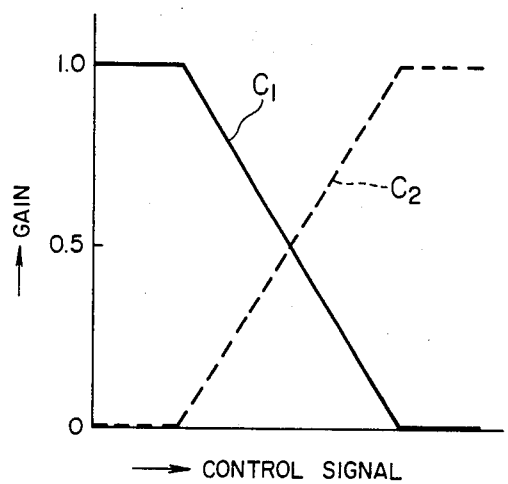
FIG. 10 is a diagram showing an example of the characteristics of gain controllers for use in the embodiments of the present invention shown in FIGS. 9 and 15.

In the embodiment shown in FIG. 5, the chrominance signal corresponding to the achromatic color as found from the signal obtained at the particular time and the chrominance signal obtained directly before the former signal are switched by the gate circuits 10a and 10b. As in another embodiment shown in FIG. 9, however, gain controllers 16a, 16b, 16c and 16d and adders 17a and 17b can also be employed. Here, by way of example, the gains of the gain controllers 16a and 16c are set so as to vary linearly versus the magnitude of a control signal as illustrated by a curve Cl in FIG. 10, and those of the gain controllers 16b and 16d are similarly set as illustrated by a curve C2 in FIG. 10. In this case, the unipolar difference signal provided from the absolute value detector 5 is applied as the control signal. When the gate circuits 10a and 10b are replaced with the gain controllers 16a, 16b, 16c and 16d, it is possible to prevent an unnaturalness in which the signals of the boundary part of a subject change-over suddenly at a certain brightness which takes place when, e.g., a lens opening is changed.

In the embodiment shown in FIG. 5, whether or not a chrominance signal at any time originally unobtainable in a place can be interpolated with the chrominance signal obtained directly before the time of interpolation is decided on the basis of the difference between a signal obtained at the time of interpolation and a signal of the same chrominance obtained one cycle before the signal. With this measure, the decision at a time $t_8$ indicated in FIG. 6(a), for example, is rendered using the difference signal of $G_2$ and $G_3$, so that the abrupt change of a subject image cannot be detected.

Therefore, when there is found the difference between a chrominance signal obtained directly before the time of interpolation and a signal of the same chrominance obtained one cycle before the signal and the difference between a chrominance signal to be obtained directly after the time and a signal of the same chrominance obtained one cycle before the signal, the abrupt change of a subject image existent between a picture element corresponding to the time and the directly preceding picture element of another color can be detected at a higher probability.

Figure 11:
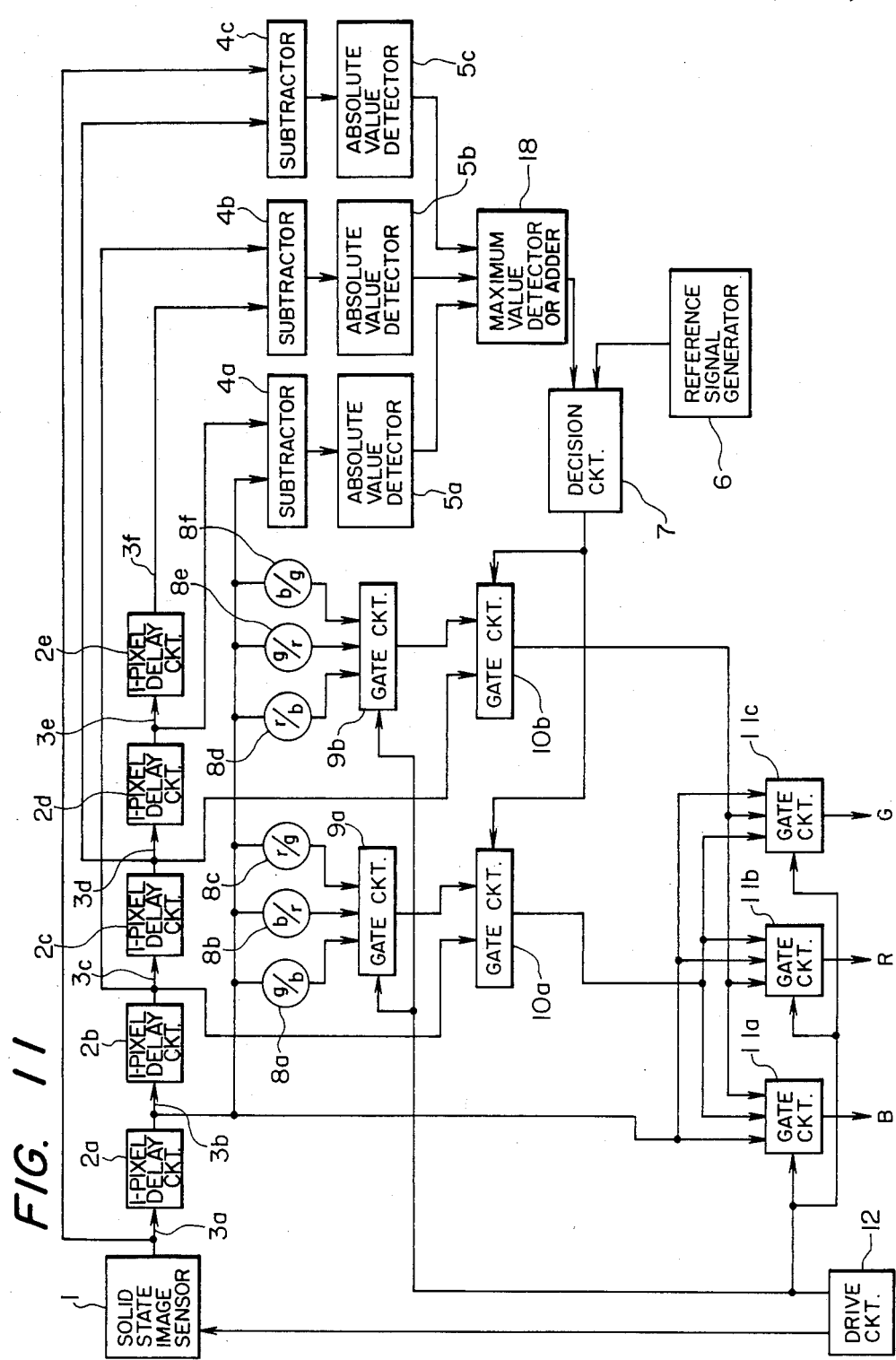

An embodiment corresponding to the above method is shown in FIG. 11. In the embodiment shown in FIG. 11, delay circuits 2a, 2b, ..., and 2e each having a delay magnitude equal to the sampling period of picture element signals are connected in series, whereby at the time $t_4$ by way of example, picture element signals $R_2$, $B_1$, $G_1$, $R_1$, $B_0$ and $G_0$ are respectively provided on output lines 3a, 3b, 3c, 3d, 3e and 3f. Here, when the signals derived from the output lines 3a and 3d are applied to a subtractor 4c, the difference signal between $R_2$ and $R_1$ is obtained, and when the signals derived from the output lines 3c and 3f are applied to a subtractor 4b, the difference signal between $G_1$ and $G_0$ is obtained. It is the same as in the embodiment shown in FIG. 5 that the signals derived from the output lines 3b and 3e are applied to a subtractor 4a thereby to obtain the difference signal between $B_1$ and $B_0$. It is also the same as in the embodiment shown in FIG. 5 that the picture element signal $B_1$ derived from the output line 3b is applied to gain controllers 8a, 8b, . . . , and 8f and gate circuits 11a, 11b and 11c, and that the picture element signals $G_1$ and $R_1$ derived from the output lines 3c and 3d are respectively applied to gate circuits 10a and 10b.

Figure 12:
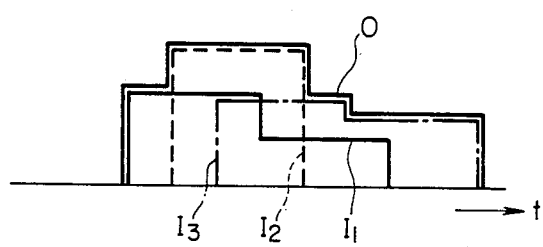
FIG. 12 a diagram used for explaining the operation of a maximum value detector for use in the embodiments of the present invention shown in FIGS. 11 and 13-16.

Output signals from the subtractors 4a, 4b and 4c are respectively applied to absolute value detectors 5a, 5b and 5c to obtain unipolar difference signals, whereupon these signals are applied to a maximum value detector 18 which delivers the maximum value among the three input signals $I_1$, $I_2$ and $I_3$ as an output signal 0 as illustrated in FIG. 12. The signal thus obtained is applied to a decision circuit 7 together with a reference signal from a reference signal generator 6 so as to obtain a control signal, with which the gate circuits 10a and 10b are controlled. The operations of the other parts of the system such as the gain controllers 8a, 8b, . . . , and 8f, the gate circuits 9a and 9b, the gate circuits 10a and 10b, and the gate circuits 11a, 11b and 11c are the same as in the embodiment shown in FIG. 5. As a result of the operations thus far described, signals R, G and B as shown in FIGS. 6(h), 6(i) and 6(j) are respectively provided from the gate circuits 11a, 11b and 11c. Since these signals are still closer to the signals to be originally obtained than the signals in FIGS. 6(e), 6(f) and 6(g) which are provided by the embodiment shown in FIG. 5, false colors appearing in a reproduced picture can be sharply reduced.

A similar effect can be expected even when an adder is employed instead of the maximum value detector 18 used in the embodiment shown in FIG. 11.

Figure 13:
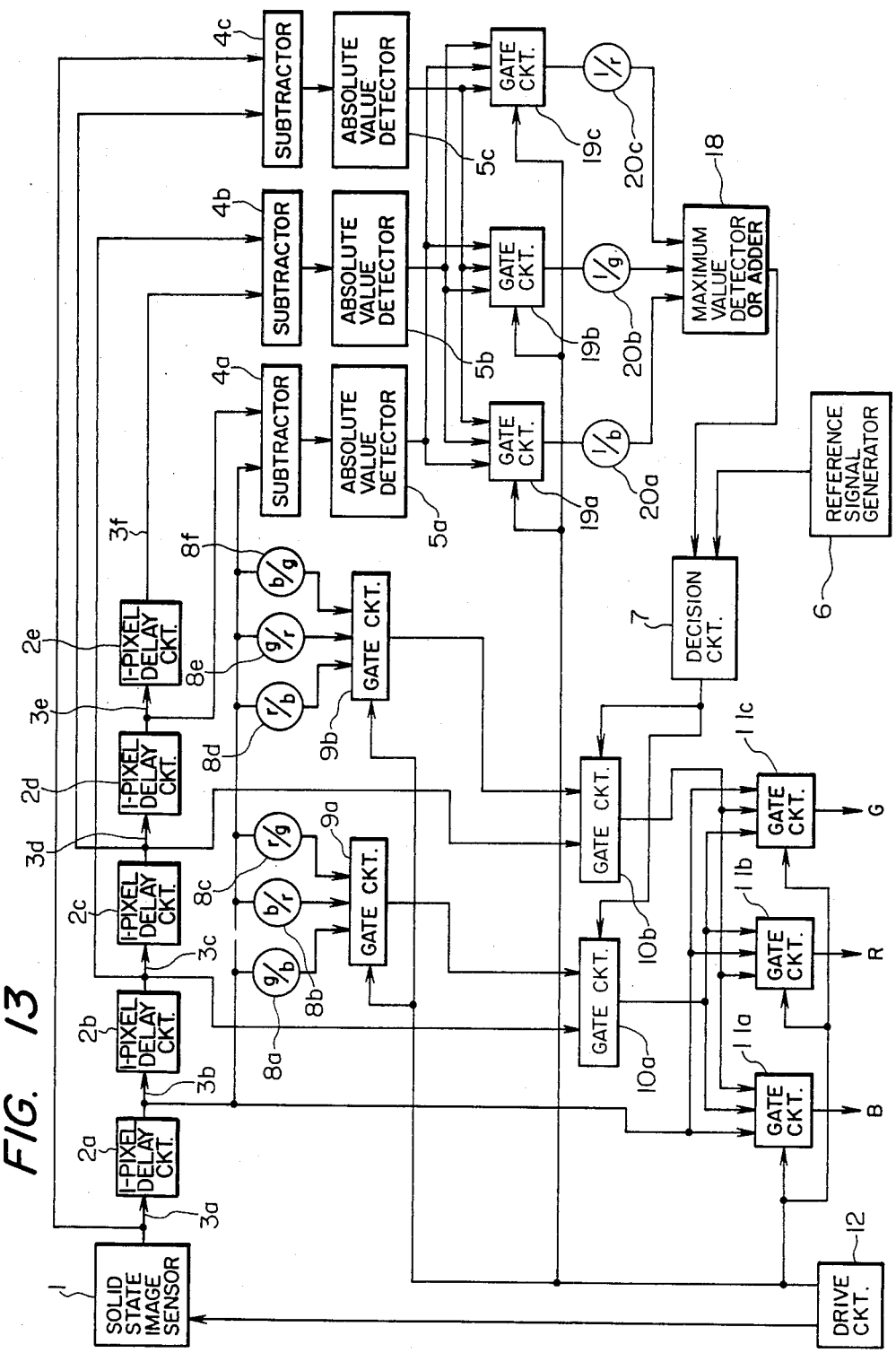

An embodiment shown in FIG. 13 improves the foregoing lowering of the detection probability attributed to the differences of the magnitudes of the R, G and B signals for the achromatic subject. Outputs from absolute value detectors 5a, 5b and 5c are applied to gate circuits 19a, 19b and 19c, and these gate circuits are controlled by a control pulse generated from a drive circuit 12 so that the difference signal of the B signal may be applied to a gain controller 20a of a gain corresponding to 1/b and so that the difference signal of the G signal and the difference signal of the R signal may be respectively applied to gain controllers 20b and 20c with gains corresponding to 1/g and 1/r. As a result, the gains controllers 20a, 20b and 20c produce the difference signals of equal magnitudes for the identical achromatic subject irrespective of the kinds of chrominance signals to be detected.

Figure 14:
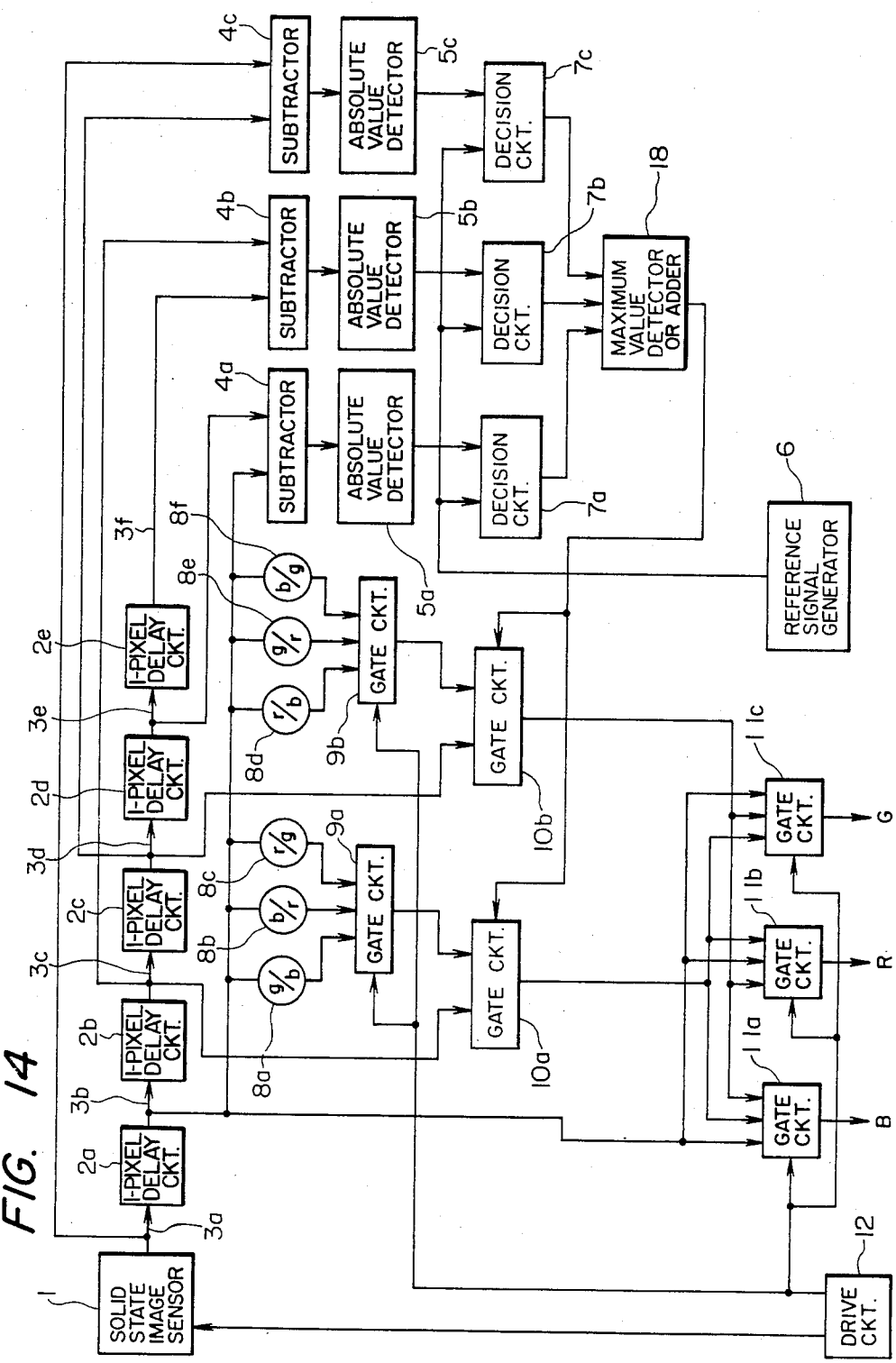

In the embodiment shown in FIG. 11, the maximum value signal of the three unipolar difference signals is obtained and is thereafter applied to the decision circuit 7. In contrast, FIG. 14 shows an embodiment wherein the outputs of the absolute value detectors 5a, 5b and 5c are respectively applied to decision circuits 7a, 7b and 7c together with the reference signal from the reference signal generator 6 so as to obtain control signals, which are thereafter applied to the maximum value detector 18. It is to be understood that the embodiment shown in FIG. 14 can achieve the same effect as in the embodiment of FIG. 11.

Figure 8:
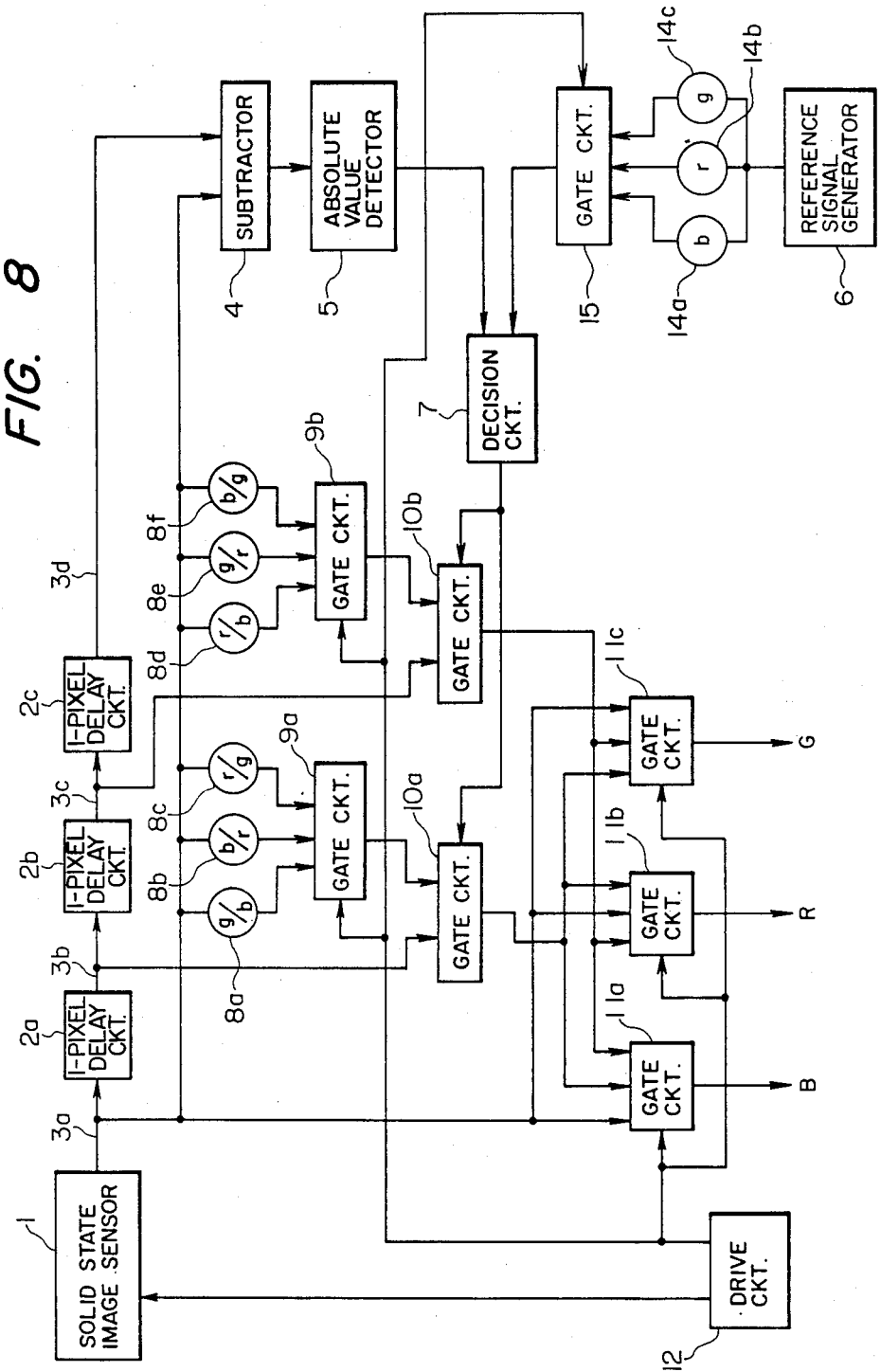
Figure 15:
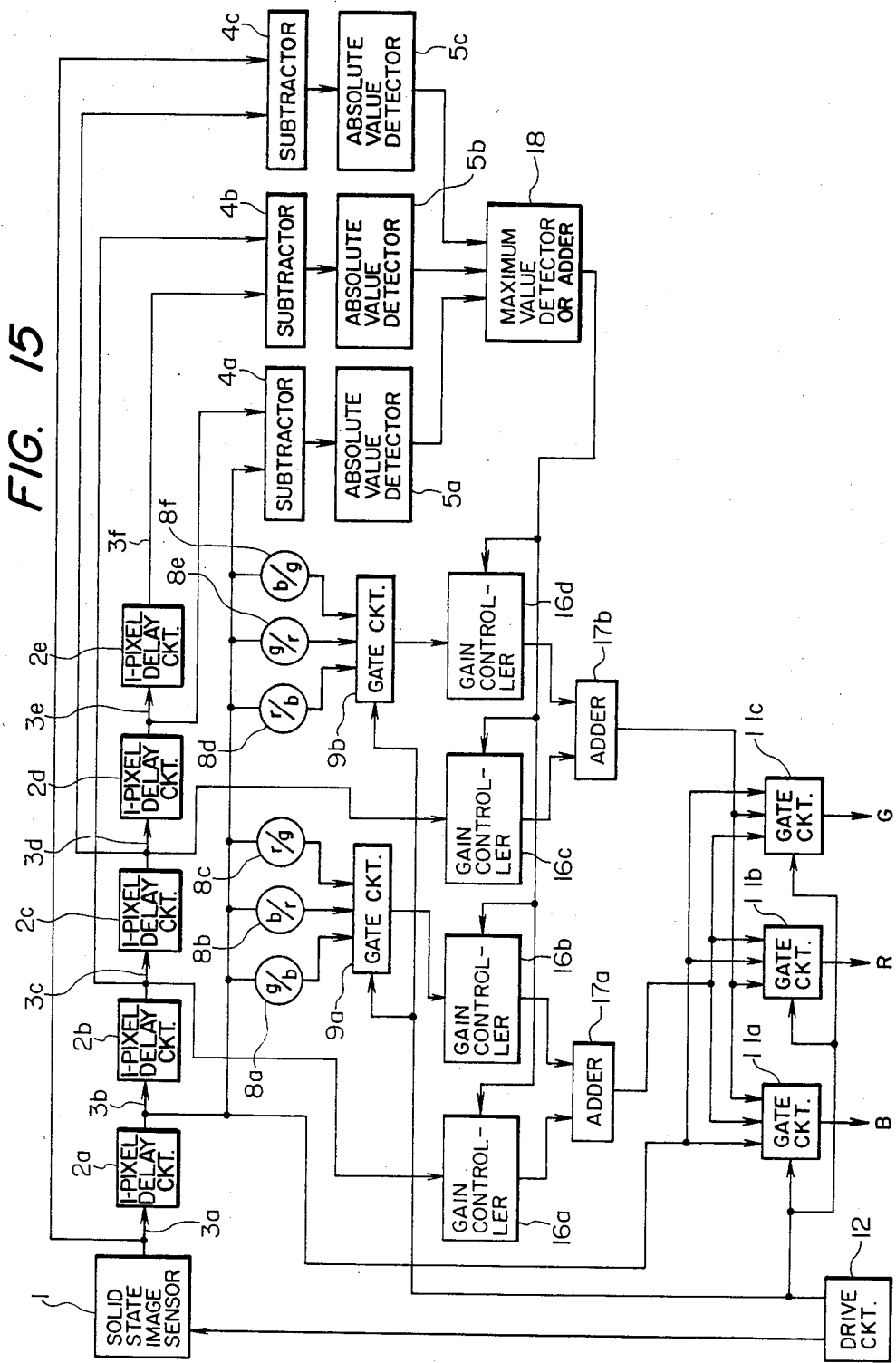

As in the embodiment shown in FIG. 8, the unnatural change-over of signals at the boundary part of a subject can be prevented when the gate circuits 10a and 10b are replaced with gain controllers 16a, 16b, 16c and 16d and adders 17a and 17b as in an embodiment in FIG. 15.

Figure 16:
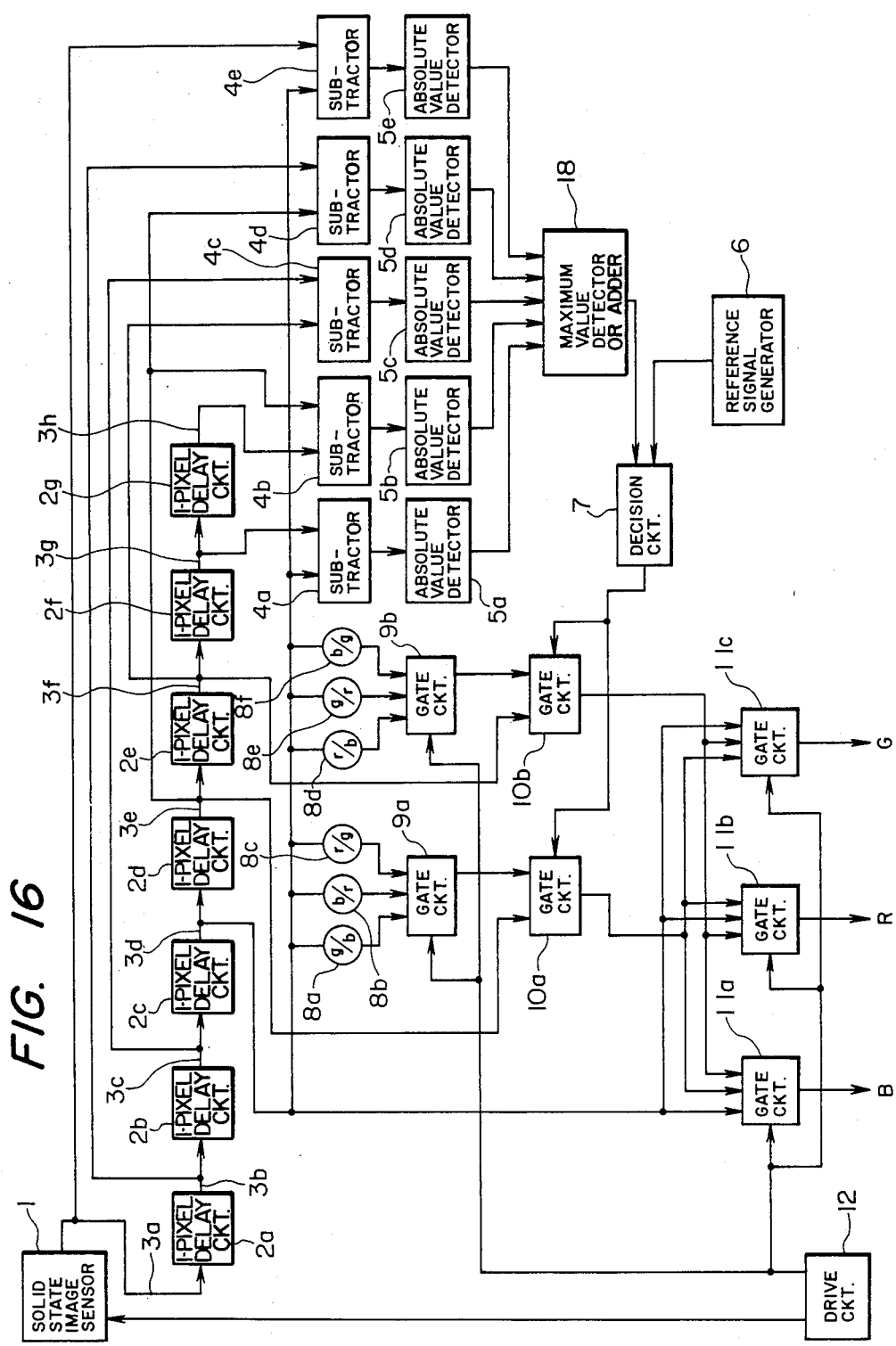

When additional kinds of difference signals are used for the decision as to whether or not a chrominance signal at any time originally unobtainable can be interpolated with the chrominance signal obtained directly before the time of interpolation, the abrupt change of a subject image existent between a picture element corresponding to the time of interpolation and a picture element corresponding to the directly preceding interpolation signal can be detected at a higher probability. By way of example, in an embodiment shown in FIG. 16, delay circuits 2f and 2g, subtracters 4d and 4e, and absolute value detectors 5d and 5e are added to the embodiment of FIG. 11, whereby for example, the decision of the signal to be obtained at the position corresponding to the time $t_3$ is rendered using the difference signal of $G_1$ and $G_2$ and the difference signal of $B_1$ and $B_2$. According to the embodiment of FIG. 16, the signals to be originally obtained are found as shown in FIGS. 6(k)–6(m), so that false colors on a reproduced picture can be eliminated.

While the present invention has been described by taking the color filters shown in FIG. 1 as the example, it is to be understood that the invention is applicable to time series signals in which several kinds of signals are successively repeated. The invention is accordingly applicable to single-chip color video cameras combined with different types of color filter assemblies such as assemblies which employ complementary color type filters as in FIGS. 17(a) and 17(b), assemblies in which repetition patterns do not consist of three picture elements as in FIGS. 17(c) and 17(d), an assembly in which each column is not unicolor as in FIG. 17(e), and an assembly which corresponds to a solid-state image sensor wherein picture elements are horizontally shifted by a half picture element pitch every second line as in FIG. 17(f). In these figures, symbol W indicates a filter transmitting all colors, symbol Cy a filter transmitting cyan, symbol Ye a filter transmitting yellow, symbol R a filter transmitting red, symbol G a filter transmitting green, and symbol B a filter transmitting blue.

We claim:

1. A solid-state imaging device including a solid-state image sensor having a plurality of picture elements which are arrayed in, at least one horizontal row, and a plurality of color filters each having one of a plurality of different color transmission characteristics which are disposed in an array in correspondence with said picture elements of said solid-state image sensor, said device comprising: first output means for providing an output signal of a first picture element one of said at least one horizontal row; second output means for providing an output signal of a second picture element which is disposed at a position preceding said first picture element in said one horizontal row and which corresponds to a color filter having a different color transmission characteristic than a color filter corresponding to said first picture element; first amplification means for amplifying said output signal provided by said first output means with a gain equal to the ratio of an output signal provided by said second output means when said second picture element images an achromatic subject having a given arbitrary luminance to an output signal provided by said first output means when said first picture element images an achromatic subject having said given arbitrary luminance; decision signal generation means for generating decision signal on the basis of a difference signal representing the difference between said output signal provided by said first output means and an output signal of a third picture element which is disposed in said one horizontal row; interpolation signal generation means for generating an interpolation signal from said output signal of said second output means and an output signal of said first amplification means as a function of the magnitude of said decision signal generated by said decision signal generation means; and first gate means for selecting singals corresponding at least one of said plurality of different color transmission characteristics from said signal provided by said first output means and said interpolation signal 2. A solid-state imaging device according to claim 1, wherein said decision signal generation means comprises third output means for providing an output signal of said third picture element, said third picture element being disposed at a position preceding said second picture element in said one horizontal row and corresponding to a color filter having the same color transmission characteristic as the color filter corresponding to said first picture element; first subtraction means for providing said difference signal representing the difference between said output signal provided by said first output means and said output signal provided by said third output means; and first absolute value detection means for providing a signal representing the absolute value of said difference signal provided by said first subtraction means.

3. A solid-state imaging device according to claim 2, wherein said decision signal generation means further comprises fourth output means for providing an output signal of a fourth picture element which is disposed at a position either preceding said third picture element or succeeding said first picture element in said one horizontal row and which corresponds to a color filter having the same color transmission characteristic as the color filter corresponding to said second picture element; second subtraction means for providing a difference signal representing the difference between said output signal provided by said second output means and said output signal provided by said fourth output means; and second absolute value detection means for providing a signal representing the absolute value of said difference signal provided by said second subtraction means.

4. A solid-state imaging device according to claim 3, wherein said decision signal generation means further comprises fifth output means for providing an output signal of a fifth picture element which is disposed at a position either preceding or succeeding said first picture element in said one horizontal row and which corresponds to a color filter having a different color transmission characteristic than the color filters corresponding to said first picture element and said second picture element; sixth output means for providing an output signal of a sixth picture element which is disposed at a position either preceding or succeeding said third picture element in said one horizontal row and which corresponds to a color filter having the same color transmission characteristic color as the color filter corresponding to said fifth picture element; third subtraction means for providing a difference signal representing the difference between output signal provided by said fifth output means and said output signal said provided by said sixth output means; and third absolute value detection means for providing a signal representing the absolute value of said difference signal provided by said third subtraction means.

5. A solid-state imaging device according to claim 4, wherein said decision signal generation means further comprises second, third, and fourth gate means each for selecting and providing as an output signal a signal corresponding to a first one, a second one, and a third one, respectively, of said plurality of different color transmission characteristics from the signals provided by said first, said second, and said third absolute value means; and second, third, and fourth amplification means each for amplifying said output signal provided by said second, said third, and said fourth gate means, respectively, with a gain determined on the basis of an output signal of a picture element corresponding to a color filter having said first one, said second one, and said third one, respectively, of said plurality of different color transmission characteristics when said picture element images an achromatic subject having said given arbitrary luminance.

6. A solid-state imaging device according to claim 5, wherein said decision signal generation means further comprises addition means for providing as said decision signal a sum signal representing the sum of an output signal of said second amplification means, an output signal of said third amplification means, and an output signal of said fourth amplification means.

7. A solid-state imaging device according to claim 5, wherein said decision signal generation means further comprises maximum signal detection means for detecting and providing as said decision signal the maximum signal of an output signal of said second amplification means, an output signal of said third amplification means, and an output signal of said fourth amplification means.

8. A solid-state imaging device according to claim 4, wherein said decision signal generation means further comprises addition means for providing as said decision signal a sum signal representing the sum of the signal provided by said first absolute value detection means, the signal provided by said second absolute value detection means, and the signal provided by said third absolute value detection means.

9. A solid-state imaging device according to claim 4, wherein said decision signal generation means further comprises maximum signal detection means for detecting and providing as said decision signal the maximum signal of the signal provided by said firsts absolute value detection means, the signal provided by said second absolute value detection means, and the signal provided by said third absolute value detection means.

10. A solid-state imaging device according to claim 1, wherein said interpolation signal generation means comprises reference signal generation means for generating reference signal; control signal generation means for comparing said reference signal with said decision signal generated by said decision signal generation means and for generating a first control signal when said decision signal is greater than said reference signal, and for generating second control signal when said decision signal is smaller than said reference signal; and second gate means for delivering as said interpolation signal an output signal of said first amplification means to an output terminal of said second gate means when said first control signal is applied to a control terminal of said second gate means and for delivering as said interpolation signal said signal provided by said second output means to said output terminal of said second gate means when said second control signal is applied to said control terminal of said second gate means.

11. A solid-state imaging device according to claim 1, wherein said interpolation signal generation means comprises second amplification means for amplying an output signal of said first amplification means with a gain varying over the range from depending on the magnitude of said decision signal; third amplification means for amplifying said output signal provided by said second output means with a gain varying over the range from 1 to 0 depending on the magnitude of said decision signal; and addition means for adding an output signal of said second amplification means to an output signal of said third amplification means to provide said interpolation signal.

12. A solid-state imaging device according to claim 1, wherein said third picture element is disposed at a position preceding said first picture element in said one horizontal row.

13. A solid-state imaging device according to claim 1, wherein said third picture element corresponds to a color filter having the same color transmission characteristic as the color filter corresponding to said first picture element.

14. A solid-state imaging device according to claim 1, wherein said decision signal generation means also generates said decision signal on the basis of a difference signal representing the difference between output signals of two other picture elements which are disposed at positions in the vicinity of said first picture element in said one horizontal row and which correspond to color filters having a different color transmission characteristic than the color filter corresponding to said first picture element.

* * * * *